United States Patent Office 3,168,562
Patented Feb. 2, 1965

3,168,562
SUBSTITUTED BENZYLGUANIDINES
Eric Walton and Graham Keith Ruffell, both of London, England, and Eugene Grivsky and John Ruxton Wood, both of Tuckahoe, N.Y., assignors to Burroughs Wellcome & Co. (U.S.A.) Inc., Tuckahoe, N.Y., a corporation of New York
No Drawing. Filed Dec. 20, 1960, Ser. No. 77,032
Claims priority, application Great Britain, Dec. 23, 1959, 43,702/59; Dec. 29, 1959, 44,161/59; May 24, 1960, 18,368/60; June 24, 1960, 22,143/60; July 7, 1960, 23,789/60
8 Claims. (Cl. 260—564)

The present invention relates to chemical compounds, to the methods for preparing them and to pharmaceutical compositions containing them.

It has been found that benzylguanidines of Formula I and the acid addition salts thereof selectively depress sympathetic nerve function and have little or no effect on the parasympathetic or central nerve functions. They are, therefore, useful in the treatment of hypertension.

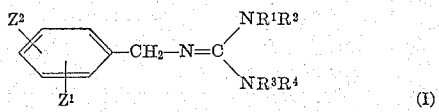

(I)

In Formula I:
$Z^1$ is in the 2 or 3 position and is a halogen atom or an alkyl, alkoxy, trifluoromethyl or nitro group when $Z^2$ is a hydrogen atom or is a substituent in the 4, 5 or 6 position and is a halogen atom or an alkyl, alkoxy, trifluoromethyl or nitro group, and $R^1$, $R^2$, $R^3$ and $R^4$ are the same or different and each is a hydrogen atom or a substituent alkyl group; or $Z^1$ is a hydrogen atom when $Z^2$ is a hydrogen atom or is a substituent in the 4 position and is a halogen atom or an alkyl, alkoxy, trifluoromethyl or nitro group, $R^1$, $R^2$, $R^3$ and $R^4$ are the same or different and each is a hydrogen atom or a substituent alkyl group, and at least two of $Z^2$, $R^1$, $R^2$, $R^3$ and $R^4$ are substituents as defined. In the above definition of $Z^1$, $Z^2$, $R^1$, $R^2$, $R^3$ and $R^4$, the alkyl group in the "alkyl" and "alkoxy" substituents contains from one to four carbon atoms.

The activity of the benzylguanidines of Formula I and the acid addition salts thereof resides in the base. For the salts, the acid used is of no consequence, though preferably it is pharmacologically and pharmaceutically acceptable; for example, it may be hydrochloric, hydrobromic, sulphuric, lactic, citric, tartaric, succinic, oxalic, p-toluenesulphonic or maleic acid.

The preferred benzylguanidines of Formula I and the acid addition salts thereof are those in which $R^1$ is a hydrogen atom, $R^2$ and $R^3$ are the same or different and each is a hydrogen atom or a methyl group, and $R^4$ is a hydrogen atom or a methyl or ethyl group. The particularly preferred benzylguanidines of Formula I and the acid addition salts thereof are N-benzyl-N', N''-dimethylguanidine, N-2-bromo- and N-2,4-dichloro-benzylguanidine, N-2-chlorobenzyl-N'-methylguanidine, N-2-bromo-, N-2-chloro-, N-2-methyl- and N-3-methylbenzyl-N',N''-dimethylguanidine, and N-2-methylbenzyl-N'-methyl-N''-ethylguanidine.

The present invention in one aspect, therefore, provides the benzylguanidines of Formula I and the acid addition salts thereof.

The benzylguanidines of Formula I and the acid addition salts thereof are prepared by any method known for preparing derivatives of guanidine. For example, they are prepared by the reaction of a guanidine $$R^5N=C(NR^6R^7)(NR^3R^9)$$

or a salt thereof with a compound $R^{10}X$, wherein $R^5$, $R^6$, $R^7$, $R^8$, $R^9$ and $R^{10}$ are each as appropriate, and not as respective, a benzyl, $R^1$, $R^2$, $R^3$ and $R^4$ group and a hydrogen atom, and X is a reactive atom or group such as a halogen atom. As a further example, they are also prepared by the reaction of ammonia or an ammonia derivative or a salt thereof with an S-substituted isothiourea or, a salt thereof, or with a cyanamide; it will be understood by those skilled in the art that the last method with cyanamide is limited to the preparation of those benzylguanidines of Formula I wherein at least $R^1$ and $R^2$ are hydrogen atoms. The ammonia derivative may be a primary or secondary amine, and the salt of ammonia may be ammonium sulphate, thiocyanate or benzenesulphonate.

The acid addition salts of the benzylguanidines of Formula I produced by the above described reactions may be converted by double decomposition either during or after the reactions into other salts. For example, the hydrochlorides may be prepared from the hydriodides by reaction with silver chloride or by warming with methanolic hydrogen chloride.

The present invention in another aspect, therefore, provides the above described methods for the preparation of the benzylguanidines of Formula I and the acid addition salts thereof.

The benzylguanidines of Formula I and the acid addition salts thereof may be presented with an acceptable carrier therefor in pharmaceutical compositions, which are made by any method which comprises the admixture of the components. For oral administration, fine powders or granules of the guanidine or salt thereof may contain diluents and dispersing and surface active agents, and may be presented in a draft in water or in a syrup; in capsules or cachets in the dry state or in a non-aqueous suspension, when a suspending agent may be included; in tablets when binders and lubricants may be included; or in a suspension in water or a syrup or an oil, or in a water/oil emulsion, when flavouring, preserving, suspending, thickening and emulsifying agents may be included; the granules or the tablets may be coated. For parenteral administration, the guanidine or salt thereof may be presented in aqueous or non-aqueous injection solutions which may contain antioxidants, buffers, bacteriostats and solutes which render the compound isotonic with the blood; or in aqueous suspensions when suspending agents and thickening agents may be included; extemporaneous injection solutions may be made from sterile pills, granules or tablets which may contain diluents, dispersing and surface active agents, binders and lubricants. The guanidine or salt thereof may also be presented in suppositories or pessaries by incorporation in a suppository base.

The dose range of the benzylguanidines of Formula I and the acid addition salts thereof suitable for administration depends on a number of variable factors such as the activity and toxicity of the particular guanidine or salt thereof, the mode and frequency of administration, and the method of making the composition. The dose range is, however, generally from 5 mg. to 500 mg. For continous medication, dosing two or three times a day is usually desirable.

The present invention in yet further aspects, therefore, provides pharmaceutical compositions containing a benzylguanidine of Formula I or an acid addition salt thereof and an acceptable carrier therefor, and the method of making such compositions by the admixture of the components.

The invention will now be described with reference to the following examples, in which all temperatures are given in degrees centigrade.

Example 1

(a) 2-bromobenzylamine (12.5 g.), S-methyl-isothiouronium sulphate (10.0 g.) and water (20 ml.) were placed in a 100 ml. Erlenmeyer flask. The mixture was heated for 1½ hours on a steam bath in a hood, during which methyl-mercaptan escaped (as evidenced by a foul odour). The reaction mixture was then cooled and diluted with alcohol (100 ml.). A colourless solid separated, was collected and was washed with alcohol. This solid melted at 230–232°; it was recrystallized from water and then melted at 247–248°. It had the correct composition for 2-bromobenzylguanidine sulphate.

(b) A mixture of 2-bromobenzylamine (14.0 g.), S-methylthiouronium sulphate (10.0 g.) and water (30 ml.) was heated on a steam-bath for about ½ hour, during which time methylmercaptan was evolved. A white solid, consisting of 2-bromobenzylguanidine sulphate, separated; it was collected, washed with alcohol and ether, and recrystallised from water, with a melting point 244–246°.

Example 2

N-ethyl-S-methylisothiourea hydriodide, melting point 83–85° (5.29 g.), 2-chlorobenzylamine (3.2 g.) and water (3 ml.) were heated at 100° for 2 hours under reflux conditions, methylmercaptan being evolved. The mixture was evaporated to dryness in vacuo, and the residual oil basified with excess of strong hydroxide solution. The solid base, which separated, was extracted with ether and the extracts evaporated. The residue was dissolved in ethanol and a slight excess of succinic acid was added. Addition of ether gave N-2-chlorobenzyl-N'-ethylguanidine hydrogen succinate, which was crystallised once from water and once from ethanol to give crystals, melting point 152–153°.

Example 3

A solution of 2,4-dichlorobenzylamine (4.2 g.) in ethanol (10 ml.) and a solution of N,S-dimethylisothiourea sulphate (5.5 g.) in water (10 ml.) were mixed and heated at 100° for 3 hours. The product was evaporated to dryness, and the residual gum converted to base by addition of sodium hydroxide solution. It was extracted with ether, and the oily base, after removal of the ether, dissolved in a slight excess of hydrochloric acid. The hydrochloride solution was evaporated to dryness and the residue crystallised from ethanol-ether to give N-2,4-dichlorobenzyl-N'-methylguanidine hydrochloride, melting point 177–184°.

warmed spontaneously at first), this mixture was evaporated, and the residue crystallised from methanol-ether to give N-2-chlorobenzyl-N',S-dimethylisothiourea hydriodide, melting point 173–176°. A portion of this hydriodide (31 g.) was converted to base by shaking with excess sodium carbonate (30 g.) in water (75 ml.), and at the same time extracted into ether. The ethereal extract was dried and evaporated to give a colourless syrup, which was redissolved in dilute sulphuric acid to a solution of about pH 5.0. This solution was reduced to a volume of about 50 ml. by vacuum evaporation, treated with 35% aqueous methylamine (100 ml.) and sufficient methanol to form a homogeneous solution, which was then gently refluxed for 6 hours. The solution was evaporated to dryness, and the white solid residue recrystallised from methanol-acetone to give N-2-chlorobenzyl-N',N''-dimethylguanidine sulphate, melting point 276–278°.

Example 16

2-bromobenzylisothiocyanate (9 g.) was added to a solution of 0.880 ammonia solution (100 ml.) and ethanol (35 ml.) and the solution warmed on a steam-bath for ½ hour. The excess of ammonia was removed by evaporation to dryness in vacuo. The residue, crystallised from aqueous ethanol, gave 2-bromobenzylthiourea, melting point 127–128°. A portion of this (5.05 g.) was suspended in ethanol (5 ml.) and methyl iodide (4.26 g.) and the mixture refluxed for 20 minutes. The resulting solution was evaporated slightly to remove excess methyl iodide. Addition of ether caused N-2-bromobenzyl-S-methyl-isothiourea hydriodide to crystallise, melting point 126–127.5°. A portion of this (3.5 g.) with aqueous ethanol (50%, 5 ml.) and a solution of dimethylamine (50% in methanol, 0.9 ml.) was refluxed for 2¾ hours. After standing at room temperature overnight a further quantity of 50% methanolic dimethylamine (0.5 ml.) was added, and the mixture refluxed for 2½ hours. The mixture was evaporated to dryness in vacuo and the residue, crystallised from n-propanol/ether, gave N-2-bromobenzyl-N',N'-dimethylguanidine hydriodide, melting point 162–163½°.

Example 17

N-2-chlorobenzyl-N',S-dimethylisothiourea hydriodide (Example 15) (3.6 g.) dissolved in ethanol (10 ml.) was treated with 33% aqueous ethylamine (5 ml.) and the mixture refluxed for 6 hours. Evaporation in vacuo yielded a gum which crystallised from acetone/ether to give N-2-chlorobenzyl-N'-ethyl-N''-methylguanidine hydriodide, melting point 102–105°.

Examples 4 to 14

| Example | Z¹ | Z² | R¹ | R² | R³ | R⁴ | Salt | Solvent of Crystallisation | M.P., deg. |
|---------|------|----|-----|----|-----|----|------------|--------------------|---------|
| 4 | H | H | CH₃ | H | CH₃ | H | Hydriodide | Ethanol/ether | 191–196 |
| 5 | 2-Cl | H | H | H | H | H | Sulphate | Hot water | 237–240 |
| 6 | 2-NO₂ | H | H | H | H | H | do | Ethanol/water | 225–228 |
| 7 | 2,4-Cl₂ | H | H | H | H | H | do | do | 219–220 |
| 8 | 2-Br | H | CH₃ | H | H | H | Hydriodide | Methanol/water | 138–141 |
| 9 | 2-Cl | H | CH₃ | H | H | H | do | Ether/propanol | 112–115 |
| 10 | 2-CH₃ | H | CH₃ | H | H | H | do | Ethanol/ether | 157–160 |
| 11 | 2-Br | H | CH₃ | H | CH₃ | H | do | do | 178–181 |
| 12 | 3-Cl | H | CH₃ | H | CH₃ | H | do | Methanol | 216–218 |
| 13 | 3-NO₂ | H | CH₃ | H | CH₃ | H | do | Methanol/ether | 227 |
| 14 | 3-CH₃ | H | CH₃ | H | CH₃ | H | do | Methanol/ethanol | 233–234 |

Example 15

To a solution of 2-chlorobenzylamine (23 g.) in ether (100 ml.) was added a solution of methylisothiocyanate (11.5 g.) in ether (50 ml.) with gentle shaking. Some heat developed, and after 5 minutes N-2-chlorobenzyl-N'-methylthiourea separated as a white crystalline solid, melting point 118–123°. The latter was collected, dissolved in methanol (60 ml.) and treated with methyl iodide (20 ml.). After being refluxed for ½ hour (it

Example 18

To a solution of 2-methylbenzylamine (12 g.) in ether (100 ml.) was added a solution of methyl isothiocyanate (7.3 g.) in ether. After about 15 minutes, the resulting crystalline precipitate, consisting of N-methyl-N'-2-methylbenzylthiourea, was collected. It melted at 130–135°.

This thiourea (12 g.) in methanol (100 ml.) was treated with methyl iodide (7.2 ml.), the mixture being refluxed for 1 hour and then cooled. Addition of ether gave a white crystalline precipitate, melting at 121–123° and consisting of N,S-dimethyl-N'-2-methylbenzylisothiourea hydriodide.

A solution of this hydriodide (7.9 g.) in warm water (30 ml.) was treated with 28% aqueous methylamine (6 ml.), and methanol (30 ml.) to give a clear solution. The mixture was gently refluxed for 12 hours, evaporated to dryness in vacuo, and the residue crystallised from methanol/ether to give N,N'-dimethyl-N''-2-methylbenzylguanidine hydriodide, melting at 187–189°.

*Example 19*

N,S-dimethyl-N'-2-methylbenzylisothiourea hydriodide (Example 18) (8 g.) dissolved in warm water (40 ml.) was treated with 33% aqueous ethylamine (8 ml.) and sufficient ethanol to give a clear solution (about 30 ml.). The mixture was refluxed for about 12 hours and then evaporated in vacuo to give a syrup, which crystallised from methanol/ether to give N-ethyl-N'-methyl-N''-2-methylbenzylguanidine hydriodide, melting at 142–146°.

*Example 20*

2-bromobenzylisothiocyanate (9.2 g.) was added to a solution of ethylamine in water (6.8 ml. of 33% w./v.) and the mixture warmed on a steam-bath for 5 minutes. Ethanol (10 ml.) was added to dissolve the oil. The mixture was refluxed for 30 minutes, and then evaporated in vacuo until an oil separated. The mixture was cooled and seeded to give N-2-bromobenzyl-N'-ethylthiourea, melting point 110½–111½°. A portion of this (10.95 g.) was suspended in ethanol (20 ml.) and methyl iodide (7.1 g.) added. Heat was evolved and the mixture was refluxed for 15 minutes. A further quantity of methyl iodide (2.3 g.) was added and the mixture warmed for 5 minutes. Excess methyl iodide was distilled off. Cooling and addition of ether gave N-2-bromobenzyl-N'-ethyl-S-methylisothiourea hydriodide, melting point 145–146°. A portion of this (2.0 g.) was refluxed with ethanol (10 ml.) and aqueous methylamine (7½ ml.; 40%) for 4½ hours. Methylmercaptan was evolved. The solution was evaporated to dryness in vacuo and the residue crystallised from n-propanol and ether to give N-2-bromobenzyl-N'-ethyl-N''-methylguanidine hydriodide, melting point 137½–138½°.

*Example 21*

2-chlorobenzylisothiocyanate (6.62 g.) was added to a solution of aqueous methylamine (10 ml.; 35%) and ethanol (10 ml.). Heat was evolved and, after the reaction had slackened, the mixture was warmed for 5 minutes on a steam-bath. It was then concentrated in vacuo until crystallisation occurred, when the mixture was cooled and the solid filtered off and washed with aqueous ethanol to give N-2-chlorobenzyl-N'-methylthiourea, melting point 118–121°. A portion of this (7.55 g.) was converted to N-2-chlorobenzyl-N',S-dimethylisothiourea hydriodide (as described in Example 20), some of which (3.56 g.) was refluxed with a solution of dimethylamine in methanol (10 ml.; 50%) for 8 hours. Methylmercaptan was evolved. The solution was evaporated to dryness in vacuo, the residue basified with sodium hydroxide solution, and the oil extracted with benzene and ether. Excess succinic acid in ethanol was added to this extract when the resultant oil slowly crystallised. Several crystallisations from n-propanol and ether gave pure N-2-chlorobenzyl-N'-N''-trimethylguanidine hydrogen succinate, melting point 112–114°.

*Example 22*

N-benzyl-N'-ethylthiourea (21.6 g.) was suspended in ethanol (10 ml.) and methyl iodide (25 ml.) was added, the heat evolved causing a gentle reflux. After standing at room temperature for 25 minutes the solution was concentrated in vacuo and N-benzyl-N'-ethyl-S-methylisothiourea hydriodide crystallised, melting point 123–124°. A portion of this was basified and converted to the hydrogen oxalate, melting point 97–99°. Some of the salt (2.98 g.) was refluxed with a solution of methylamine in methanol (25 ml.; 40% w./v.) and water (15 ml.) for 5 hours. The solution was evaporated to dryness in vacuo and the residue dissolved in dilute hydrochloric acid, washing with ether to remove some non-basic material. The acid solution was basified with sodium hydroxide solution and the oil extracted with ether. The ether extracts were evaporated to dryness and a solution of oxalic acid in n-propanol, followed by ether, was added. N-benzyl-N'-ethyl-N''-methylguanidine hydrogen oxalate crystallised, melting point 162–163°.

*Example 23*

Benzylisothiocyanate (14.9 g.) was added slowly to a solution of n-propylamine (15 ml.) in n-propanol (20 ml.), cooling in water to moderate the exothermic reaction. The resultant solution after standing at room temperature for 20 minutes was evaporated to dryness in vacuo and the residue crystallised from benzene/light petroleum (boiling point 60–80) to give N-benzyl-N'-n-propylthiourea, melting point 93–94°. A portion of this (16.5 g.) was added to methyl iodide (20 ml.) when it dissolved with slight warming. After standing ½ hour at room temperature the solution was evaporated to dryness in vacuo and the residue slowly crystallised on standing under ether. This was crude N-benzyl-S-methyl-N'-n-propylisothiourea hydriodide, melting point 71–76° which was not purified further. A portion of the hydriodide (3.5 g.) was refluxed with a solution of methylamine in methanol (20 ml.; 40%) for 5½ hours. The resultant solution was evaporated to dryness in vacuo; the residue was dissolved in dilute hydrochloric acid, the solution washed with ether and then basified with sodium hydroxide solution, and the oil extracted with ether. The extracts were evaporated to dryness in vacuo and a solution of oxalic acid in n-propanol, followed by ethyl acetate and ether, added. N-benzyl-N'-methyl-N''-n-propylguanidine hydrogen oxalate crystallised, melting point 158½–159½°.

*Example 24*

Tablets (0.555 g.) of N-2-chlorobenzyl-N',N''-dimethylguanidine sulphate were made by mixing the salt (0.25 g.) in a fine powder with lactose (0.25 g.) and starch (0.05 g.), granulating the mixture with alcohol or alcoholic polyvinyl pyrrolidine or a mixture of equal parts of alcohol and water, drying the granules at 40°, adding magnesium stearate (0.005 g.) as a lubricant and compressing the mixture.

*Example 25*

Tablets (0.505 g.) of N-2-chlorobenzyl-N',N''-dimethylguanidine sulphate were made by granulating the salt (0.5 g.) in a fine powder with equal parts of alcohol and water. Magnesium stearate (0.005 g.) as a lubricant was added, and the mixture compressed directly.

*Example 26*

Injection solutions containing N-2-chlorobenzyl-N',N''-dimethylguanidine sulphate in water of injection (0.2 g./per ml.) were made by autoclaving the solution at 15 lb. steam pressure for 30 minutes in unit dose ampoules or multidose containers. For the latter, the water for injection contained benzyl alcohol (1.0%), phenol (0.5%) or chlorocresol (0.1%).

*Example 27*

Tablets and injection solutions similar to those described in Examples 24, 25 and 26 and containing N-benzyl-N',N''-dimethylguanidine hydroiodide, N-2-bromobenzyl- or N-2,4-dichlorobenzyl-guanidine sulphate, N-2,4-dichlorobenzyl-N'-methylguanidine hydrochloride or N-3-methylbenzyl-N',N''-dimethylguanidine hydroiodide, instead of the N-2-chlorobenzyl-N',N''-dimethylguanidine sulphate, were made in analogous manners.

We claim:
1. A benzylguanidine selected from the class consisting of N-benzyl-N',N''-dimethylguanidine, N-2,4-dichlorobenzylguanidine, N,N'-dimethyl-N''-3-methylbenzylguanidine, N-2-chlorobenzyl-N',N''-dimethylguanidine, N,N'-dimethyl-N''-2-methylbenzylguanidine, N-3-chlorobenzyl-N',N''-dimethylguanidine, N-2-chlorobenzyl-N'-methylguanidine and N-ethyl-N'-methyl-N''-2-methylbenzylguanidine and salts of said benzylguanidines with therapeutically acceptable acids.

2. A benzylguanidine selected from the class consisting of N-benzyl-N',N''-dimethylguanidine and salts of said benzylguanidine with therapeutically acceptable acids.

3. A benzylguanidine selected from the class consisting of N-2,4-dichlorobenzylguanidine and salts of said benzylguanidine with therapeutically acceptable acids.

4. A benzylguanidine selected from the class consisting of N-2-chlorobenzyl-N'-methylguanidine and salts of said benzylguanidine with therapeutically acceptable acids.

5. A benzylguanidine selected from the class consisting of N-2-chlorobenzyl-N',N''-dimethylguanidine and salts of said benzylguanidine with therapeutically acceptable acids.

6. A benzylguanidine selected from the class consisting of N,N'-dimethyl-N''-2-methylbenzylguanidine and salts of said benzylguanidine with therapeutically acceptable acids.

7. A benzylguanidine selected from the class consisting of N,N'-dimethyl-N''-3-methylbenzylguanidine and salts of said benzylguanidine with therapeutically acceptable acids.

8. A benzylguanidine selected from the class consisting of N-ethyl-N'-methyl-N''-2-methylbenzylguanidine and salts of said benzylguanidine with therapeutically acceptable acids.

References Cited in the file of this patent

UNITED STATES PATENTS

| | | |
|---|---|---|
| 605,977 | Seifert | June 21, 1898 |
| 1,766,755 | Lecher et al. | June 24, 1930 |
| 2,299,012 | Ericks et al. | Oct. 13, 1942 |
| 2,425,341 | Paden et al. | Aug. 12, 1947 |
| 2,890,984 | Sahyun | June 16, 1959 |
| 2,928,768 | Freedman et al. | Mar. 15, 1960 |

OTHER REFERENCES

Kusami et al.: C.A., volume 45, p. 5643 (1951).
Saijo: C.A., volume 47, p. 8079 (1953).
Lieber et al.: J.Org. Chem., volume 22, pages 1054–1956 (1957).
Shapiro et al.: J.A.C.S., volume 81, pages 2220–2225 (1959).
Buck: J.A.C.S., vol. 64, pp. 2231–2232 (1942).